United States Patent [19]
Egalon et al.

[11] Patent Number: 5,343,550
[45] Date of Patent: Aug. 30, 1994

[54] TRANSVERSELY POLARIZED SOURCE CLADDING FOR AN OPTICAL FIBER

[75] Inventors: Claudio O. Egalon; Robert S. Rogowski, both of Hampton, Va.

[73] Assignee: The United States of America as represented by the United States National Aeronautics and Space Administration, Washington, D.C.

[21] Appl. No.: 22,582

[22] Filed: Feb. 25, 1993

[51] Int. Cl.$^5$ .................................................. G02B 6/16
[52] U.S. Cl. ...................... 385/123; 385/11; 385/125; 385/126; 385/127; 385/12
[58] Field of Search ................. 385/12, 123, 125, 126, 385/127, 128, 11

[56] References Cited

U.S. PATENT DOCUMENTS

| | | | |
|---|---|---|---|
| 3,113,076 | 12/1963 | Jacobs | 167/82 |
| 3,851,648 | 12/1974 | Brooke | 128/260 |
| 4,560,248 | 12/1985 | Cramp et al. | 385/12 |
| 4,726,651 | 2/1988 | Wei et al. | 385/12 |
| 4,729,620 | 3/1988 | Pavlath | 385/11 |
| 4,729,622 | 3/1988 | Pavlath | 385/11 |
| 4,790,619 | 12/1988 | Lines et al. | 385/12 X |
| 4,792,448 | 12/1988 | Ranade | 424/438 |
| 4,795,233 | 1/1989 | Chang | 385/11 |
| 4,803,076 | 2/1989 | Ranade | 424/438 |
| 4,824,206 | 4/1989 | Klainer et al. | 385/12 |
| 4,834,496 | 5/1989 | Blyler, Jr. et al. | 385/12 |
| 4,852,967 | 8/1989 | Cook et al. | 385/12 |
| 4,880,752 | 11/1989 | Keck et al. | 435/7 |
| 5,064,577 | 11/1991 | Soane | 264/1.4 |
| 5,133,037 | 7/1992 | Yoon et al. | 385/132 |

FOREIGN PATENT DOCUMENTS

| | | |
|---|---|---|
| 0259113 | 3/1988 | European Pat. Off. |
| 0259219 | 3/1988 | European Pat. Off. |
| 1022171 | 3/1966 | United Kingdom |

OTHER PUBLICATIONS

T. W. Hagler et al., "Enhanced order and electronic delocalization in conjugated polymers oriented by gel processing in polyethylene", *Physical Review*, vol. 44, No. 16, The Am. Phys. Soc., Oct. 15 (1991), pp. 8652–8667.

A. W. Snyder et al., "Optical Waveguide Theory", Inst. of Adv. Studies, Australian National University, Canberra, Australia, London New York, Chapman and Hall, (1989), pp. 250–253 and pp. 522–523. (no month available).

W. H. Press et al., "Numerical Recipes: The art of Scientific computing (FORTRAN Version)", Cambridge University Press (1986), pp. 252–255. (no month available).

*Primary Examiner*—Frank Gonzalez
*Attorney, Agent, or Firm*—George F. Helfrich; Kimberly A. Chasteen; Harry Lupuloff

[57] ABSTRACT

An optical fiber comprising a fiber core having a longitudinal symmetry axis is provided. An active cladding surrounds a portion of the fiber core and comprises light-producing sources which emit light in response to chemical or light excitation. The cladding sources are oriented traversely with respect to the longitudinal axis of the fiber core. This polarization results in a superior power efficiency compared to active cladding sources that are randomly polarized or longitudinally polarized parallel with the longitudinal symmetry axis.

6 Claims, 3 Drawing Sheets

TRANSVERSELY POLARIZED SOURCE CLADDING FOR AN OPTICAL FIBER

ORIGIN OF THE INVENTION

The invention described herein was jointly made in the performance of work under a NASA contract and an employee of the United States Government. In accordance with 35 U.S.C. 202, the contractor elected not to retain title.

RELATED CASES

The present application relates to pending patent applications entitled "Optical Fibers and Fluorosensors Having Improved Power Efficiency and Methods of Producing Same," U.S. Ser. No. 07/761,198, filed Sep. 16, 1991, NASA Case No. LAR 14525-1-CU, now U.S. Pat. No. 5,262,638 issued Nov. 16, 1993, and "Optical Fiber Sensor Having an Active Core," U.S. Ser. No. 07/855,363, filed Mar. 18, 1992, NASA Case No. LAR 14607-1-SB, now U.S. Pat. No. 5,249,251 issued Mar. 18, 1992, the specifications of which are hereby incorporated by reference into the present application.

BACKGROUND OF THE INVENTION

1. Technical Field of the Invention

The present invention relates generally to optical fibers having an active cladding and more particularly to such optical fibers wherein the active sources located in the cladding are polarized to increase the core injection efficiency of the fiber.

2. Discussion of the Related Art

Absorption and emission of evanescent waves are well-known phenomena that have been theoretically and experimentally investigated and widely used for sensing purposes. For example, absorption of evanescent waves is used to determine the concentration of methane-gas with a tapered optical fiber. In this approach, a He—Ne laser excites bound modes in the fiber. The chemical species surrounding the tapered region of the fiber absorbs the evanescent wave associated with these modes at a specific wavelength. This absorption can be detected at the end of the fiber as a decrease in the output signal level and the concentration of the species inferred.

Using evanescent wave coupling, an optical fiber sensor has been developed with a fluorescent cladding to detect molecular oxygen. Evanescent waves are a factor whenever radiation is totally internally reflected between two dielectric media having different indices of refraction. Although most of the incident power is reflected, part of the radiation, termed the evanescent component of the field, penetrates a very thin layer of the dielectric having the lower index of refraction. Specifically, an optical fiber is clad during manufacture with a polymer such as polydimethyl siloxane which has a fluorescent dye dissolved therein. The dye itself is sensitive to the presence of molecular oxygen. The fluorescent cladding was excited via evanescent waves upon side-illumination at a wavelength within the excitation range of the dye. As before, some light was trapped in the core by evanescent coupling.

The active sources in the cladding thus produce light waves. In most cases, the active sources are usually treated as many infinitesimal electric dipole currents having random phase and random orientation which excite radiation fields and bound modes in the optical fiber. The assumption of random orientation is justified in many cases since that is the orientation usually found by fluorescent molecules. An optical fiber source for chemical detection having an active cladding is disclosed in U.S. Pat. No. 4,834,496 to Blyler, Jr. et al., which issued May 30, 1989, the specification of which is hereby incorporated by reference. It is desirable to increase the power efficient $P_{eff}$ (defined below) of an optical fiber having an active cladding.

OBJECTS

It is accordingly an object of the present invention to increase the power efficiency of an optical fiber having an active cladding.

It is another object of the present invention to increase the power efficiency of an optical fiber having an active cladding while varying core refractive index.

It is a further object of the present invention to accomplish the foregoing objects in a straightforward manner.

Other objects and advantages of the present invention are apparent from the drawings and specification which follow.

SUMMARY OF THE INVENTION

The foregoing and additional objects are obtained by an optical fiber according to the present invention. A fiber core is provided having a longitudinal symmetry axis. An active cladding surrounds a portion of the fiber core and comprises light-producing sources which emit light in response to chemical or light excitation. The cladding sources are oriented transversely with respect to the longitudinal axis of the fiber core. This polarization results in a superior power efficiency compared to active cladding sources that are randomly polarized or longitudinally polarized sources that are parallel to the longitudinal axis.

DETAILED DESCRIPTION

Figure 1:
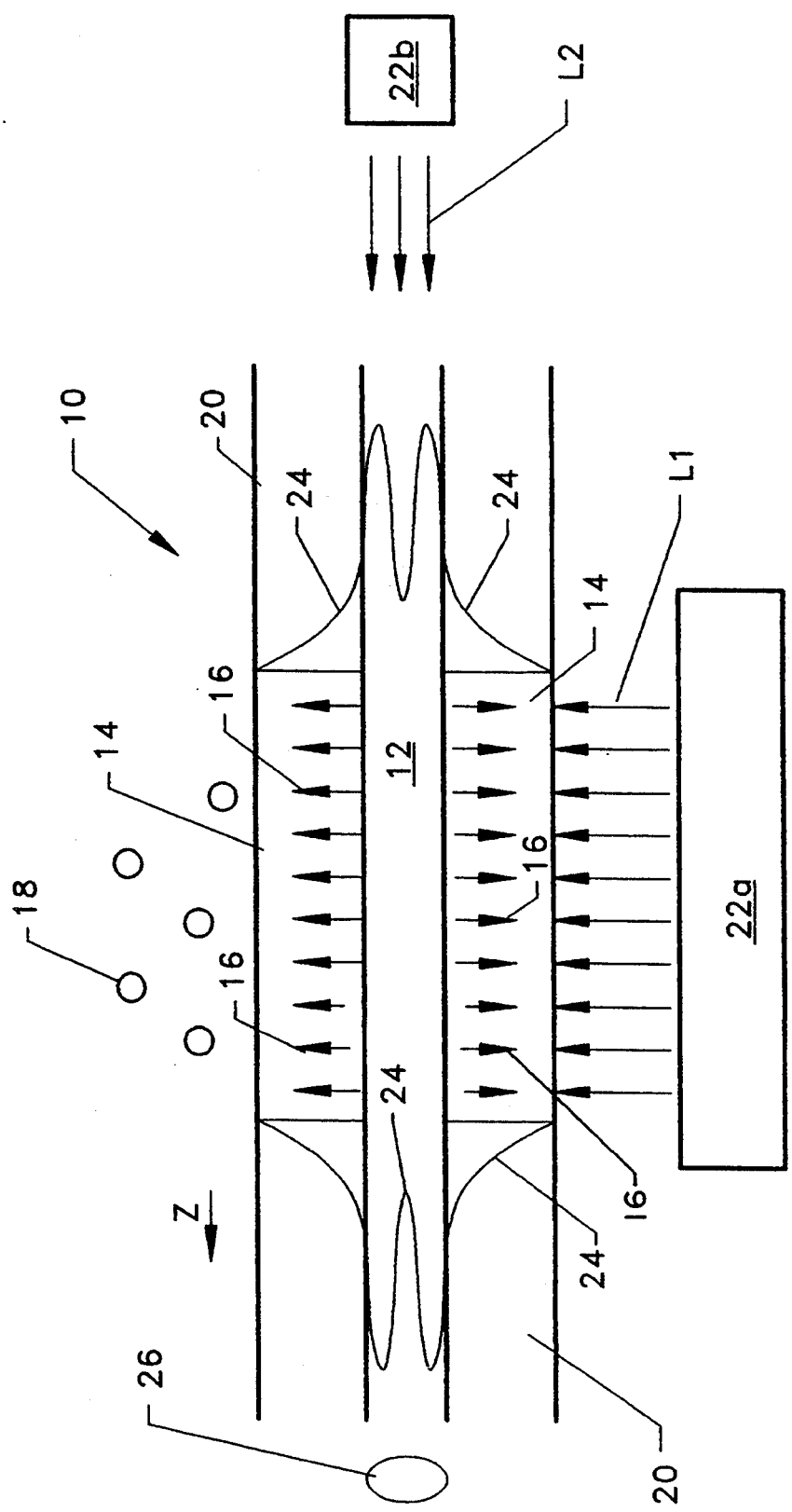
FIG. 1 is a cross-sectional view along the z-axis of an optical fiber having transversely polarized active cladding sources according to the present invention.

An active cladding step index profile optical fiber, also known as a distributed sensor, is generally designated by reference numeral 10 in FIG. 1. Optical fiber 10 is used to provide information of a chemical species or analyte via evanescent wave interaction. The optical fiber 10 comprises a core fiber 12, a portion of which is cladded or coated with a matrix 14, e.g., a polymer, which has fluorescent or chemiluminescent substances 16, hereinafter referred to as active sources, dissolved therein. The matrix 14 is permeable to the particular chemical species or analyte 18 being sensed and the fluorescent or chemiluminescent active sources 16 interact selectively with chemical species or analyte 18.

If active sources 16 are chemiluminescent, the active sources emit light via a chemical reaction with the analyte 18. If active sources 16 are fluorescent, excitation is accomplished either via an outside light source 22a which illuminates the side of matrix 14 with light L1 or by an outside light source 22b which injects light L2 into one end of core 12 and excites the sources via evanescent wave absorption. Regardless of the excitation method, active sources 16 produce light 24 which is injected into core 12 and guided throughout the core 12 via inactive guide cladding 20 to a light detector 26 for appropriate analysis. Guide cladding 20 and matrix 14 have equivalent outer radii. The intensity of the detected signal is a function of the concentration of the particular chemical species or analyte 18 which permeates matrix 14.

Figure 2:
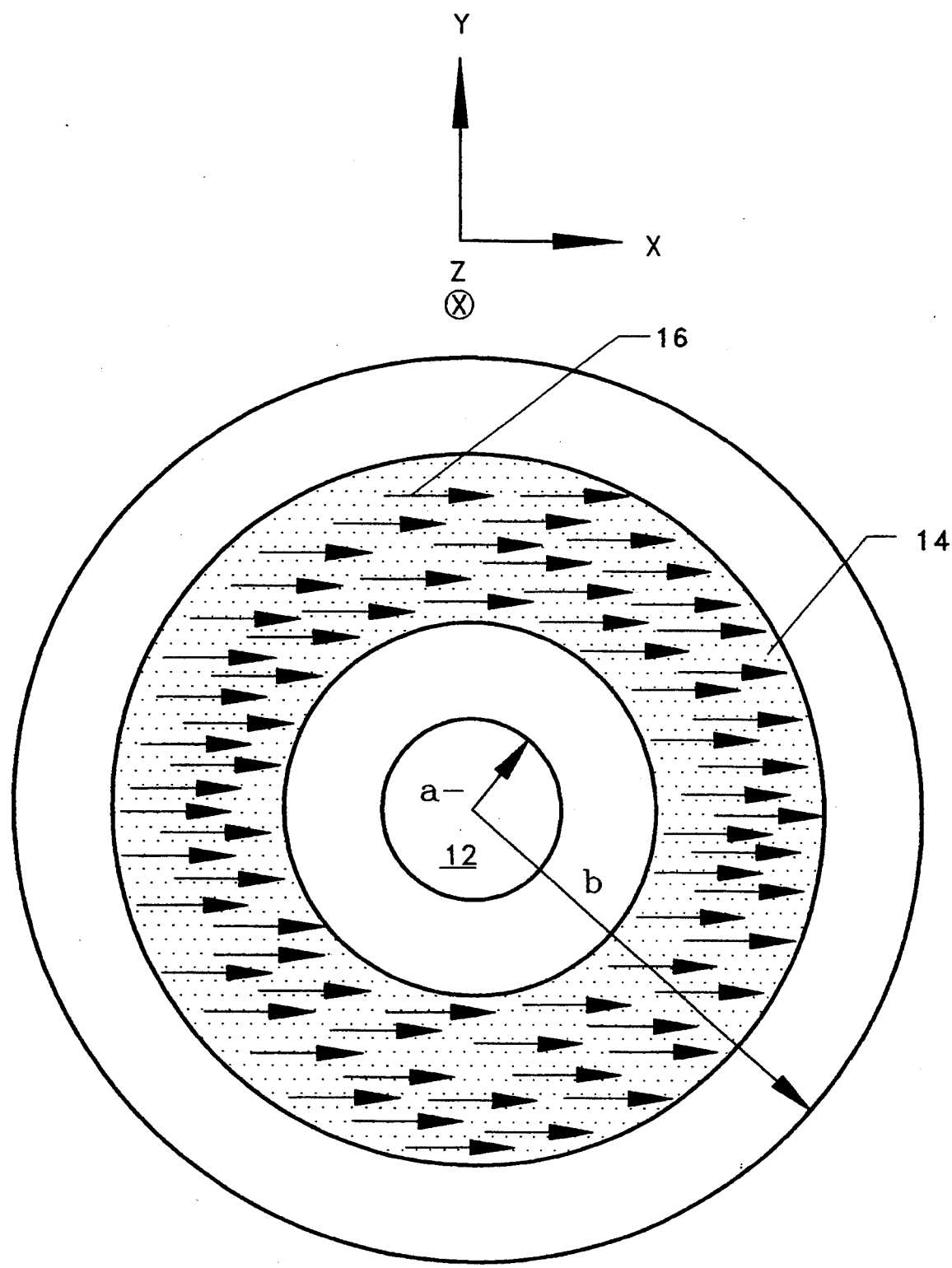
FIG. 2 is a cross-sectional view in the x-y plane of an optical fiber having transversely polarized active cladding sources according to the present invention.

As mentioned in the Discussion of the Related Art, it is normally assumed that the dipole sources are uniformly distributed and have a random phase and random orientation. See, e.g., previously identified related U.S. patent application Ser. No. 07/761,198, filed Sep. 16, 1991 and now U.S. Pat. No. 5,262,638 issued Nov. 16, 1993. In the present application, the active cladding sources 16 are treated as many infinitesimal electrical currents with random phase and a determined orientation which are distributed between the radius $r_{in}$ and the radius $r_{out}$, as shown in FIG. 2. Specifically, the active cladding sources 16 are oriented transversely with respect to the longitudinal axis of the fiber extending in the z-direction. In FIG. 2 this transverse orientation is depicted in the x-direction; however, due to symmetry, the orientation could be depicted in the y-direction as well. Any cladding matrix having transversely oriented cladding sources is applicable to the present invention. For example, a polymer having highly anisotropic, polarized photoluminescence is discussed in "Enhanced Order and Electronic Dislocalization in Conjugated Polymers Oriented by Gel Processing in Polyethylene" by T. W. Hagler et al., published in *Physical Review*, Vol. 44, No. 16, pp. 8652-8666, Oct. 15, 1991. Any process is appropriate as long as the sources are oriented in substantially the same direction to permit coating on the fiber core so that the sources are oriented transversely with respect to the symmetry axis of the core. The sources excite radiation fields and bound modes. The radiation fields radiate away from the fiber; however, the bound modes are trapped inside the core and propagate in both forward and backward directions. The expressions for the power associated with both the radiation field and bound modes for a distribution of polarized sources, $P_{rad,n}$ and $P_{core,n}$, are $$P_{rad,n} = \sum_{\nu=0}^{\infty} \int_0^{kan_{clad}} <|c_{n,\nu}(Q)|^2> P_\nu(Q) dQ \tag{1a}$$

where $$<|c_{n,\nu}(Q)|^2> = \frac{S_n}{16P_\nu^2(Q)} \int_{V_{sources}} |e_{n,\nu}(r)|^2 r dr d\phi dz, \tag{1b}$$

and

-continued $$P_{core,n} = \sum_{\nu,\mu} \frac{1}{16P_{\nu,\mu}} \int_{V_{sources}} S_n |e_{\nu,\mu}^n(r)|^2 dV \tag{2}$$

where n is the direction of orientation of the sources, i.e. x, y, z or a combination thereof as shown the coordinate system in FIG. 2; $S_n$ is the source strength for sources oriented in the n-direction; $P_{\nu,\mu}$ and $P_\nu$ are normalization constants for the bound and radiation modes; and $e_{\nu,\mu}^n(r)$ and $e_{n,\nu}(r)$ are the n-components of the electric fields of the bound and radiation modes respectively. They are all given by Snyder et al. in *Optical Waveguide Theory*, Chapman and Hall, New York, N.Y., (1983). The power efficiency at one end of the fiber can be described as $$P_{eff,n} = \frac{P_{core,n}}{P_{rad,n} + 2P_{core,n}} \tag{3}$$

If $P_{rat,n}$ is defined as $P_{core,n}/P_{rad,n}$, then eq. (3) is rewritten as $$P_{eff,n} = \frac{P_{rat,n}}{1 + 2P_{rat}} \tag{4}$$

The factor $2P_{core}$ in the denominator of eq. (3) was introduced to account for both forward and backward propagating modes in the core. It should be noticed that due to the cylindrical symmetry, the $P_{eff}$ for sources polarized in both x and y directions are the same.

Experimentally, it is easier to obtain a thin film distribution of polarized sources, where $R_{in} = 1$ and $R_{out} = 1 + \tau$. For a thin film, $\tau$ must obey the inequality $\tau << 1/W_{\nu,\mu}$. For this case we have in the transverse electric TE modes $$P_{rat,x,y}|TE = \frac{3}{4n_{clad}ka^2V^2} \sum_\mu \frac{U_{0,\mu}^2 K_1^2(W_{0,\mu})}{\beta_{0,\mu}K_0(W_{0,\mu})K_2(W_{0,\mu})} \tag{5}$$

$$P_{rat,z}|TE = 0; \tag{6}$$

for the transverse magnetic TM modes, $$P_{rat,x,y}|TM = \frac{3n_{core}^2}{4k^3a^2n_{clad}^5} \sum_\mu \left| \frac{\beta_{0,\mu}}{\frac{|J_1|}{J_1^2(U_{0,\mu})} - \frac{n_{core}^2}{n_{clad}^2} \frac{|K_1|}{K_1^2(W_{0,\mu})}} \right| \tag{7}$$

$$P_{rat,z}|TM = \frac{3n_{core}^2}{2k^3a^2n_{clad}^5} \sum_\mu \left| \frac{\frac{W_{0,\mu}^2}{\beta_{0,\mu}} \frac{K_0^2(W_{0,\mu})}{K_1^2(W_{0,\mu})}}{\frac{|J_1|}{J_1^2(U_{0,\mu})} - \frac{n_{core}^2}{n_{clad}^2} \frac{|K_1|}{K_1^2(W_{0,\mu})}} \right| \tag{8}$$

and in the hybrid modes $HE_{\nu,\mu}$ and $EH_{\nu,\mu}$, $$P_{rat,x,y}|HIB = \frac{3}{2n_{clad}n_{core}^2k^3a^2} X \tag{9}$$

-continued $$\sum_{\nu,\mu} \frac{\frac{2a_1{}^2 K_{\nu-1}^2(W_{\nu,\mu})}{W_{\nu,\mu}^2} + \frac{2a_2{}^2 K_{\nu+1}^2(W_{\nu,\mu})}{W_{\nu,\mu}^2}}{K_\nu{}^2(W_{\nu,\mu}) \left| \frac{a_1 a_3 |J_{\nu-1}| + a_2 a_4 |J_{\nu+1}|}{J_\nu{}^2(U_{\nu,\mu})} - \frac{U_{\nu,\mu}^2}{W_{\nu,\mu}^2} \frac{a_1 a_5 |K_{\nu-1}| + a_2 a_6 |K_{\nu+1}|}{K_\nu{}^2(W_{\nu,\mu})} \right|}$$

$$P_{rat,z}|_{HIB} = \frac{3}{n_{clad}n_{core}^2 k^3 d^4} \sum_{\nu,\mu} \frac{U_{\nu,\mu}^2}{\beta_{\nu,\mu}} X \tag{10}$$

$$\frac{1}{\frac{|a_1 a_3 |J_{\nu-1}| + a_2 a_4 |J_{\nu+1}||}{J_\nu{}^2(U_{\nu,\mu})} - \frac{U_{\nu,\mu}^2}{W_{\nu,\mu}^2} \frac{a_1 a_5 |K_{\nu-1}| + a_2 a_6 |K_{\nu+1}|}{K_\nu{}^2(W_{\nu,\mu})}}$$

where $$|K_l| = \begin{vmatrix} K_l(W_{\nu,\mu}) & K_{l+1}(W_{\nu,\mu}) \\ K_{l-1}(W_{\nu,\mu}) & K_l(W_{\nu,\mu}) \end{vmatrix}$$

and $$|J_l| = \begin{vmatrix} J_l(U_{\nu,\mu}) & J_{l+1}(U_{\nu,\mu}) \\ J_{l-1}(U_{\nu,\mu}) & J_l(U_{\nu,\mu}) \end{vmatrix},$$

and where k is the circular wave number of the light produced by the active cladding, i.e., $k=2\pi/\lambda$ where $\lambda$ is the wavelength of the light produced by the active cladding sources; $n_{clad}$ is the index of refraction of the active cladding; $n_{core}$ is the index of refraction of the core; a is the radius of the core; $\beta_{o,\mu}$ is the propagation constant; and $$V = ka \sqrt{n_{core}^2 - n_{clad}^2} = \sqrt{U_{\nu,\mu}^2 + W_{\nu,\mu}^2}. \tag{11}$$

A FORTRAN program was used to compute the sum of Equations (5)–(10). Four different eigenvalue equations which are transcendental were used, each one corresponding to the TM, TE, HE and EH modes. The solutions for these equations are the eigenvalues of $U_{\nu,\mu}$. The eigenvalues have well-known limits as described in the previously discussed *Optical Waveguide Theory* by Snyder et al. which can be used to determine the roots of the eigenvalue equations. The ZBRENT subroutine of Numerical Recipes was used to find the roots. This subroutine employs the Secant method in conjunction with the Bisection method and is discussed in *Numerical Recipes, The Art of Scientific Computing*, W. H. Press et al., Cambridge University Press, Cambridge, Mass., 1986.

Figure 3:
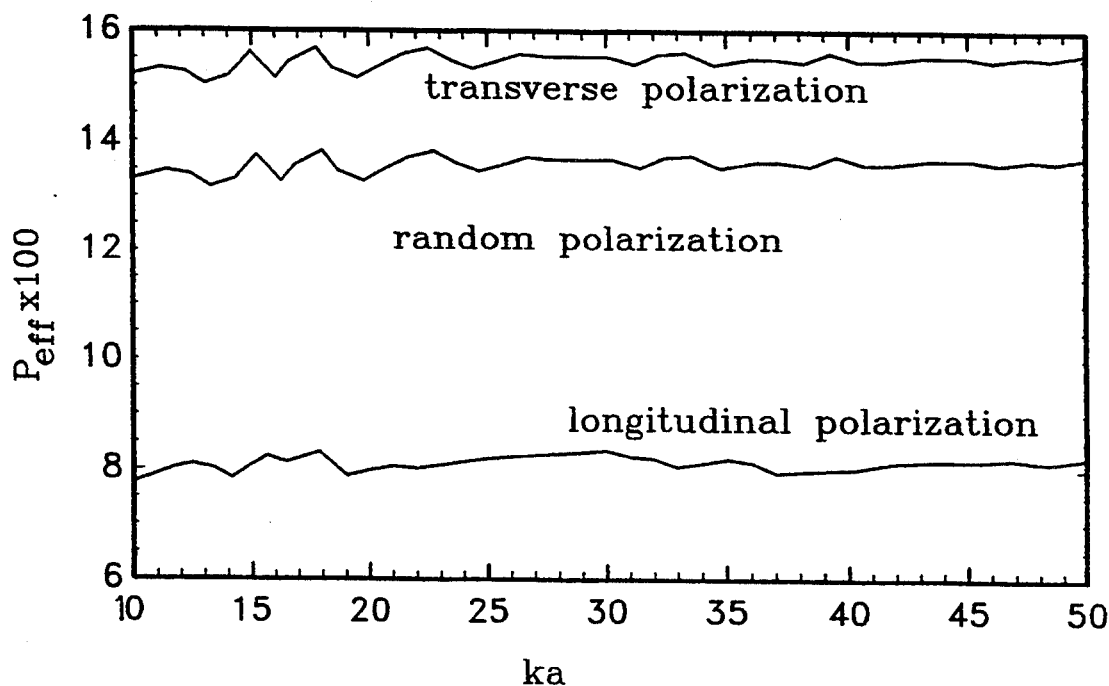
FIG. 3 graphs the power efficiency $P_{eff}(\times 100)$ versus ka factor for optical fibers differing only in the polarization of the active sources in the cladding.

FIG. 3 compares the $P_{eff}$ of transversely polarized sources with the $P_{eff}$ of conventional active cladding sources with random distribution against the factor ka. Notice that a fiber with sources polarized in the transverse direction is more efficient. It is also apparent from FIG. 3 that a fiber with sources oriented in the longitudinal, z-direction is less efficient than either transversely oriented or randomly oriented cladding sources. This result is attributed to the fact that the intensity of the longitudinal electric field of the bound modes is smaller than in either of the other situations. The factor ka does not have a significant correlation with $P_{eff}$. In FIG. 3, a thin film of active cladding sources as defined above was used for each situation and the indices of refraction for the core and cladding were held fixed respectively at $n_{core}=1.5$ and $n_{clad}=1.0$.

Figure 4:
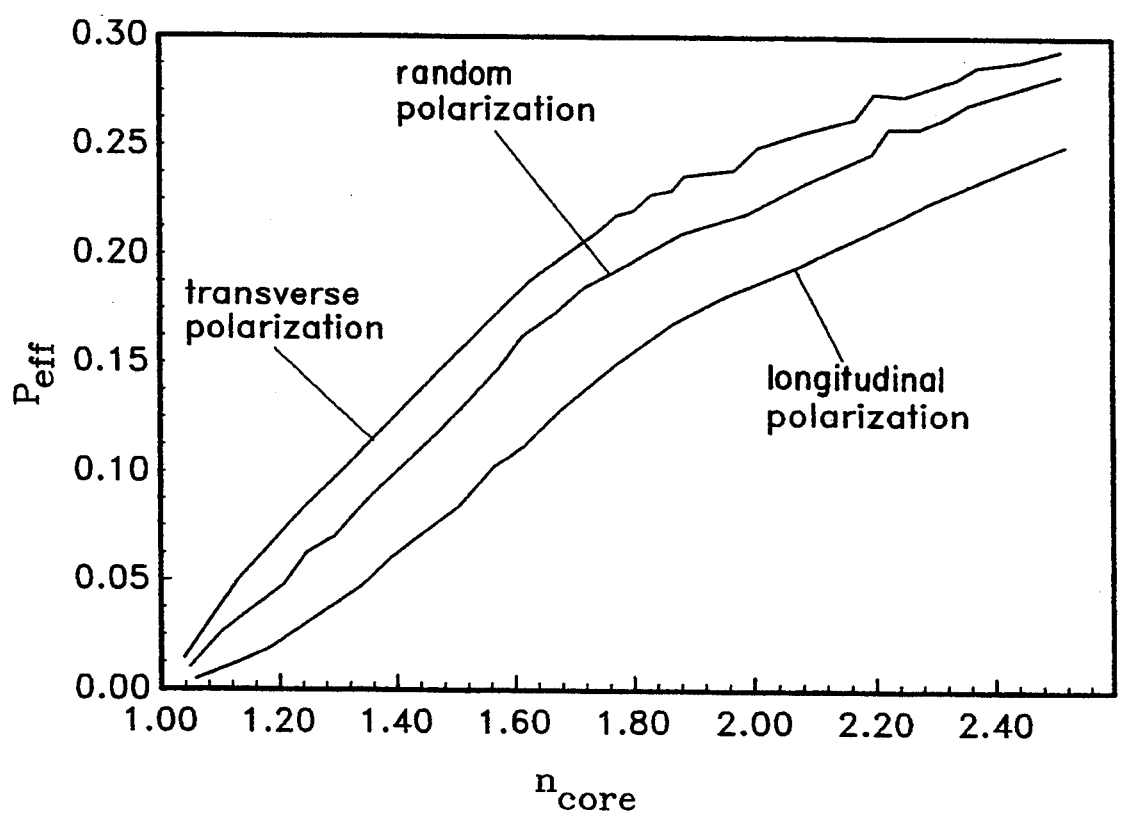
FIG. 4 graphs the power efficiency $P_{eff}$ versus $n_{core}$ for optical fibers differing only in polarization of the active sources in the cladding.

FIG. 4 displays the behavior of $P_{eff}$ versus $n_{core}$ for three optical fibers having active cladding sources that are randomly, transversely, and longitudinally polarized. The $P_{eff}$ of each increased with $n_{core}$, with the transverse source orientations once again having a greater $P_{eff}$ than random source orientation or the least efficient longitudinal source orientation. The value used for $n_{clad}$ was 1.0, i.e., a thin-film exposed to the outside air. Once again, a thin film of active cladding sources was used for each situation, and $n_{clad}$ was held fixed at 1.0 and ka was held fixed at 50.

Using Equations (5)–(10), it can be proved that the most efficient source orientation is the transverse one (x or y). In other words, fibers with sources whose dipole orientation is expressed as a linear combination of the transverse and longitudinal unitary cartesian vectors or, $$j = j_x \hat{x} + j_y \hat{y} + j_z \hat{z} \tag{12}$$

are still less efficient than fibers that have their sources solely oriented in the transverse direction, $j_z=0$.

The present invention thus permits an optical fiber having an improved power efficiency to be produced. The use of transversely oriented active cladding sources results in optical fibers which are more sensitive.

Many modifications, improvements and substitutions will be apparent to the skilled artisan without departing from the spirit and scope of the present invention as described in this application and defined in the following claims.

We claim:

1. An optical fiber having an improved power efficiency comprising:
    a fiber core having a longitudinal axis;
    an active cladding surrounding a portion of said fiber core, the active cladding containing light-producing sources each having a dipole moment and oriented such that the dipole moments of the light-producing sources are transverse to the longitudinal axis of said fiber core.

2. The optical fiber according to claim 1 wherein the light-producing sources are fluorescent.

3. The optical fiber according to claim 1 wherein the light-producing sources are chemiluminescent.

4. A method of producing an optical fiber having an improved power efficiency, comprising the steps of:

providing a fiber core having a longitudinal axis;
cladding the fiber core with a matrix containing light-producing sources, the dipole moments of which are oriented transversely with respect to the longitudinal axis of the fiber core.

5. The method according to claim 4 wherein the light-producing sources are fluorescent.

6. The method according to claim 4 wherein the light-producing sources are chemiluminescent.

* * * * *